April 14, 1970  J. W. MORRIS  3,506,423

GLASS STRENGTHENING BY ION EXCHANGE

Filed May 28, 1969  2 Sheets-Sheet 1

INVENTOR
JOHN W. MORRIS

BY
ATTORNEYS

FIG. 3

United States Patent Office 3,506,423
Patented Apr. 14, 1970

3,506,423
GLASS STRENGTHENING BY ION EXCHANGE
John W. Morris, Tarentum, Pa., assignor to PPG Industries, Inc., Pittsburgh, Pa., a corporation of Pennsylvania
Continuation-in-part of application Ser. No. 730,088, May 17, 1968, which is a continuation-in-part of application Ser. No. 557,594, May 19, 1966. This application May 28, 1969, Ser. No. 830,923
Int. Cl. C03c 21/00
U.S. Cl. 65—30                                4 Claims

ABSTRACT OF THE DISCLOSURE

This invention pertains to a method of strengthening alkali metal containing flat glass articles by exchange of an alkali metal ion of larger atomic diameter from an external source for an alkali metal ion of smaller atomic diameter of the glass while maintaining the glass at an elevated temperature below its strain point. This invention particularly relates to conducting at least a portion of the ion exchange while the glass is supported upon a partial or total gas support of the type described in U.S. Patent No. 3,233,501, the description therein being incorporated herein by reference.

---

The present application is a continuation-in-part application of U.S. Ser. No. 730,088, filed May 17, 1968, now abandoned, which, in turn, was a continuation-in-part application of U.S. Ser. No. 557,594, filed May 19, 1966, now U.S. Patent No. 3,396,075, which, in turn, was a continuation-in-part application of U.S. Ser. No. 224,894, filed Sept. 17, 1962, now abandoned.

According to the present invention, increases in impact resistance, breaking stress, penetration resistance, etc., are secured in glass articles, particularly lime-soda-silica flat glass articles such as windshields, spandrels, and other glass sheet suitable for use as viewing or like glass closures or partitions for buildings or transportation compartments, by contacting the glass article with a potassium salt at a high temperature preferably above 875° F. for a brief period of time. The contact treating time at temperatures above 875° F. rarely exceeds 25 to 40 minutes, but is longer for lower temperatures of treatment.

As a consequence of this treatment a compressive stress is established in the glass not only at the outer most surfaces of the glass article, but also extending from the surface for a finite thickness inwardly towards the center of the treated glass article. While the central region of the glass sheet is under some tension, the magnitude of such tensile stress, in pounds per square inch, is substantially less than the maximum compressive stress, also measured in pounds per square inch, at the outer surface of the treated glass sheet.

The tensile stress in the central region is well below the stress at which a notched piece of such glass fails under tensile stress, and the center tensile stress seldom exceeds 100 to 300 pounds per square inch for glass thicknesses of 0.06 inch and greater, the center tensile stress being less for thicker glass samples. The ratio of maximum compressive stress in the outer region(s) to maximum tensile stress in the central interior region generally ranges from at least about 100 to 500 to 1 for glass thicknesses of 0.06 inch and greater.

While the present invention will be illustrated hereinafter by discussion primarily relating to monolithic glass sheets and laminates having excellent strength, it should be realized that the basic effect of practice of the present invention is to increase substantially the scope of utility of glass to include its use where high strength properties and surface compression properties are advantageous in a myriad of fabricated articles of commerce. Hence, the value of the present invention extends not only to windsheilds but also to other glass articles such as those used in the construction field and all of the fields where materials are required to possess high strength properties, e.g., spandrels, windows, etc.

The invention is applicable to a wide range of sodium-containing glasses. In such glasses $SiO_2$, $B_2O_3$ and/or $Al_2O_3$ may be the principal network formers and various alkaline earth metal oxides may be present as fluxes to aid in the melting of the glasses. For example, silicate glasses containing in excess of 40 percent by weight of $SiO_2$, 0 to 15 percent by weight of $B_2O_3$, 0 to 15 percent by weight of $Al_2O_3$, 0 to 25 percent by weight of CaO, MgO, SrO, BaO, PbO and/or ZnO and combinations thereof, 0 to 10 percent $TiO_2$, 0 to 10 percent $K_2O$ and 2 to 20 percent by weight of sodium oxide can be employed in the practice of the invention.

The articles of the present invention offer dramatic improvements in breaking strength and impact resistance when compared to conventional glass articles. The articles of this invention are produced from window and plate glass compositions having an initial sodium to potassium weight ratio (prior to treatment) in excess of 1 to 1, and preferably in excess of 5 to 1, for example, such glasses as soda-lime-silica glass. Such glasses uually have the following composition:

|  | Percent by weight |
|---|---|
| $Na_2O$ | 10 to 15 |
| $K_2O$ | 0 to 5 |
| CaO | 5 to 15 |
| $SiO_2$ | 65 to 75 |
| MgO | 0 to 10 |
| $B_2O_3$ | 0 to 5 |

A typical soda-lime-silica glass suitable for use in accordance with this invention has the following composition:

|  | Percent by weight |
|---|---|
| $SiO_2$ (usual variation 71 to 74%) | 71.38 |
| $Na_2O$ (usual variation 12 to 14%) | 12.76 |
| $K_2O$ (usual variation 0 to 1%) | 0.03 |
| CaO (usual variation 8 to 12%) | 9.67 |
| MgO (usual variation 2 to 5%) | 4.33 |
| $Na_2SO_4$ (usual variation 0.1 to 1.0%) | 0.75 |
| $Fe_2O_3$ (usual variation 0.1 to 1.0%) | 0.15 |
| $Al_2O_3$ (usual variation 0.1 to 1.0%) | 0.81 |

As shown by the above table, these glass compositions usually have a large excess of sodium over potassium. The weight ratio of concentration of sodium to potassium in such soda-lime-silica glass compositions generally ranges from about 25 to 1 to upwards of 150 to 1 and even higher since some soda-lime-silica glass compositions contain only trace amounts of potassium or no potassium. As a general rule, the higher the sodium content in the glass to be treated, the greater the strength which can be obained in the glass articles.

After treating soda-lime-silica glass according to the present invention, the chemical nature of the alkali oxide constituents of the outer surface of the glass article is altered radically. That is to say that at the outermost surface of the glass the sodium is essentially replaced by potassium. Yet at the central interior regions of the glass article the sodium content remains substantially unchanged by the treatment. Therefore, at the outer surfaces(s) of the glass article, there exists a high potassium to sodium weight ratio, whereas in the central interior region(s) there exists a high weight ratio of sodium to potassium.

The region of maximum potassium concentration exists in a layer which is parallel to the surface of the glass and which extends for about 0.5 to 1.0 micron in from the surface of the glass. The potassium concentration tapers off gradually in any layer parallel to the surface of the glass as the distance of that layer from the surface of the glass is greater, with the potassium concentration ultimately being substantially the same as in the untreated glass in a layer remote from the surface of the glass, i.e., 6 to 10 microns from the surface of the glass. This is shown graphically in FIG. 3 and explained further in the description of FIG. 3 hereinafter.

In the practice of this invention the potassium salt is contacted with the glass article while the potassium salt is maintained in molten condition. The equilibrium temperature of reaction is generally maintained at a temperature above 875° F. to insure as rapid a treatment cycle as possible thus enabling more articles to be produced in any given period of time.

As used herein the terms "equilibrium temperature of reaction," "contact temperature," etc., are employed to denote the temperature at which the potassium exchange is conducted. Conveniently this temperature is arrived at by (1) preheating and maintaining the potassium salt at a temperature preferably above 875° F., and (2) preheating the glass to a temperature preferably above 875° F. prior to contact of the glass with the potassium salt, viz., preheating the glass to a temperature approximating that at which the salt is maintained.

When an immersion contacting technique is used, the temperature of the surfaces of the glass sheets being treated is generally closely correlated to the temperature at which the potassium salt treating bath is maintained. Hence, it is generally preferable to preheat the surfaces of the glass sheets to be treated to a temperature approximating that at which the molten potassium salt bath is maintained prior to contacting the glass sheets with the treating bath. However, it will be realized that the glass can be heated to a higher temperature than that at which the potassium salt bath is maintained, and the converse is also true. That is to say, the potassium salt bath can be maintained at a temperature below 875° F. as long as the glass is heated to a sufficiently high temperature to provide a "composite" or "interfacial" reaction temperature of 875° F. or higher. Conversely the glass temperature can be below 875° F. as long as the potassium salt bath is heated to a sufficiently high temperature to insure a reaction temperature of 875° F. or higher. At significantly lower temperatures, the potassium exchange procedure is much slower.

Thus, it is within the purview of the present invention to employ any combination of glass temperature and potassium salt temperature which will yield a composite (equilibrium) temperature of reaction of about 875° F. and above. Further it is within the purview of this invention to use potassium salts other than potassium nitrate, such as potassium chloride, sulfate and mixtures thereof, which can be molten or solid at the contact temperature.

At lower temperatures the effect of such contact is much slower with the result that production of glass articles herein contemplated is difficult to achieve within periods of time which are commercially practicable. For example, one hour's immersion of lime-soda-silica glass in molten potassium nitrate at 700° F. does not improve the strength properties of the glass substantially. Much longer periods of immersion at this temperature are required to produce strengths comparable to that achieved in the minimal time periods, e.g., 5 to 10 minutes at the higher temperatures. At temperatures exceeding 875° F., the desired strength improvement is attained even more rapidly.

The upper limit of the contact temperature is dependent upon the softening temperature and melting temperature of the glass article being treated. Thus, the contact temperature cannot be so high as to exceed the melting temperature of the glass composition, but it can exceed the strain point and even the softening point of the glass composition under certain circumstances.

Thus, as long as the glass can be properly supported, the contact temperature can even be maintained at a temperature above the softening temperature of the glass provided that the contact treatment time at these elevated temperatures is of sufficiently short duration to avoid thermal relaxation of the potassium exchange induced strength characteristics. In fact, in some cases it is possible to maintain the contact temperature within the softening temperature range of the particular glass article being treated. Under these thermal conditions extremely short contact times can be employed, viz., contact times of the order of one minute, and even less.

While temperatures as high as 1200° F. to 1400° F. can be employed, as mentioned above, consistently superior results are secured using contact temperatures ranging from about 900° F. to 1100° F.; and for most glass articles, this temperature range is sufficiently high to secure the composite strength characteristics in the improved glass articles of the present invention.

The contact treating time, viz., the length of time during which the glass article is contacted with the potassium treating salt, generally ranges from about 5 to about 25 to 40 minutes at the high temperature mentioned hereinabove. In general, treatment durations substantially in excess of 25 to 40 minutes at temperatures substantially in excess of 875° F. do not materially improve the strength properties which attend the articles of the present invention over those obtained in shorter periods. In fact, prolonged contact at these temperatures can be objectionable. Thus, it has been observed that long heating (two or more hours) of the treated glass at temperatures substantially in excess of 900° F., whether while in contact with potassium nitrate or otherwise, results in loss in strength properties. For example, heating the glass sheet for a period in excess of 2 hours at 1000° F. while it is in contact with the potassium results in a material loss in the strength improvement attained at the shorter periods mentioned above. The reason for this loss is not completely understood; however, it can be postulated that over extended periods of time at these high temperatures there is a relaxation of the compressive stresses set up in the glass. Also there may occur in the glass a rearrangement or migration of the potassium and sodium, which rearrangement or migration results in reduced strength. For these reasons the glass, after treatment, should be cooled below 875° F., preferably below 300° F. to 500° F., rapidly and in any event before the compressive stress imparted to the glass is materially reduced. However, cooling should not be carried out so rapidly as to break the potassium treated glass due to thermal shock.

Contacting the glass with the potassium treating salt for times substantially less than 5 minutes can be satisfactorily conducted provided that sufficiently high temperatures are employed to secure the necessary potassium exchange in the surface regions of the glass article being treated, and provided that the potassium exchange (potassium diffusion) is conducted into a sufficient depth of the outer glass surface to insure a resulting potassium to sodium ratio after treatment such that the exchange induced surface ratio concentration of potassium to sodium is in excess of 1 to 1 for a surface depth of at least about 1 micron and preferably even deeper.

That is to say that in order to secure the utmost benefits of the strength characteristics which can be imparted to the improved glass articles of the present invention, it is necessary to conduct the potassium exchange so that there is a depth penetration of potassium for at least a finite thickness towards the mid-plane of the glass article. Thus, the increase in strength is sufficiently deep on a penetration level so that subsequent abrasive treatments, such as those involved by handling in prepressing and autoclaving to form safety-glass laminates, or other fabricating operations to which the treated glass sheet(s) may be later subjected, will not cause substantial loss of the strength characteristics imparted by the potassium exchange induced treatment.

Another factor to be considered when lower contact times, viz., contact treating times substantially below 5 minutes, are employed is the effect the high treating temperatures can have upon the viscosity characteristics of the glass article being treated. Where avoidance of thermal deformation of the glass article is a significant factor, temperatures substantially below the melting temperature of the particular glass composition should be used. The terms "melting temperature," "strain point," and "softening point" as used herein are standard terms in the glass art and are defined in the American Society for Testing Materials Booklet C162-56. However, even in view of the above criteria, it is possible, when using a glass article supporting system which can minimize or substantially eliminate the effects of thermal deformation, to employ treating temperatures above that at which the glass composition exhibits some plasticity. Thus, when glass supporting systems, e.g., a partial or total gas support (wherein the supporting medium is air or an inert gaseous substance) are employed in conjunction with the use of elevated temperatures, the contact times can be reduced to a contact treatment time even as low as several seconds to several minutes.

The inert gas utilized in the support system mentioned above is a hot gas, as described in U.S. Patent 3,223,499 at column 1, line 57, which serves to support the glass in a distortion-free condition and also provide the heat energy necessary to maintain proper temperature for ion exchange strengthening to take place below the strain point of the glass. The strengthening process whereby alkali metal ions of a salt are exchanged for smaller alkali metal ions of a glass is temperature dependent, the hot gas supporting the glass provides the heat energy necessary for ion exchange to proceed.

In such a case, the contacting procedure whereby the glass article is contacted with the molten potassium treating salt can be conveniently affected by some means other than immersion. For example, the potassium salt can be deposited readily on the glass surface prior to raising the temperature of both the glass and the potassium salt to the elevated temperatures required for treating. Or the poassium salt can be deposited from above by flowing it onto the outer surface of the glass while both the glass and potassium salt are maintained at treatment temperatures.

It is also possible to employ a contacting procedure which involves a combination of immersion and non-immersion procedures with the former occurring prior to the latter. In such a procedure the immersion ("in tank") contact can be at very high temperatures, for example, 1000° F. to 1100° F. for an extremely short period of time, for example, two minutes or less, followed by non-immersion ("out of tank") contact at lower temperatures, for example, 900° F. to 975° F., for longer periods of time. The total contact at the temperatures above 875° F. is, however, generally within a range previously discussed. For example, the glass article is preheated to a temperature of approximately 900° F. to 950° F. and then dipped into a preheated molten potassium salt bath maintained at about 1050° F. for a period of from 15 to 60 seconds to initiate potassium exchange. The glass article is removed from the salt bath with a salt film being retained on its surface and subjected to a temperature of 925° F. for ten minutes to allow further "out of tank" exchange to take place. The article is then cooled. As used herein the terms "contact time," "contact treating time," etc., refer to the total period of time during which the glass surfaces are in contact with the potassium treating salt at a temperature of at least 875° F. Other variations in techniques of achieving contact of the glass article with the potassium treating salt will be apparent to those skilled in the art once the benefit of applicant's invention has become known.

The benefits and advantages attendant to the articles of the present invention are generally applicable to glass articles regardless of their thickness. Thus, for example, dramatic increases in breaking strength are secured in glass windshield lights which are of a thickness of about 0.090 inch and ⅛ inch. However, thinner or thicker windshield lights can also be treated with an attendant increase in strength of these glass windshield lights. Therefore, the present invention includes glass articles irrespective of their thickness. Hence, the present invention is adaptable to increasing the surface strength characteristics of very thin and very thick glass articles, viz., glass articles having thicknesses of the order ranging from 1/32 of an inch to ¼ inch all the way up to extremely thick glass articles such as structural glass articles, e.g., glass doors.

The nature of the potassium salt which is employed to treat the glass articles is important in that a potassium salt must be used which can be employed at high temperatures, i.e., temperatures ranging from about 875° F. to 1100° F. or even higher, without objectionable decomposition of the potassium salt occurring. The potassium salt of choice is potassium nitrate. The potassium nitrate salt can be employed either alone or in conjunction with other potassium salts, e.g., potassium chloride, to constitute the potassium salt treating bath to effect the exchange of potassium for the sodium present in the glass article. When a mixed potassium salt bath is employed, such as a mixture of potassium nitrate and potassium chloride, it is preferable to employ a predominating mole percent of potassium nitrate. An exemplary mixed potassium salt treating bath within the purview of the present invention is one having about 70 mole percent potassium nitrate and 30 mole percent potassium chloride. However, the advantages attendant to the method of the present invention can be secured using a potassium nitrate-potassium chloride treating bath having a potassium nitrate mole percent ranging from about 50 percent to 100 percent.

In the production of the articles of this invention over extended periods of time, when a plurality of glass sheets are successively immersed in the molten potassium salt bath, sodium gradually accumulates in the bath from day to day or from week to week. For example, in a typical instance it was noted that seriatim dips of 133 pairs of windshield lights resulted in an increase of sodium in the potassium nitrate bath from 0.073 percent to 0.095 percent by weight.

As the sodium content increases, the degree of compressive stress in the glas surface falls causing a corresponding reduction in glass strength. Thus, unless proper precautions are observed, sheet which are dipped in a late stage of a campaign are not as strong as sheets dipped in the early stage thereof because of sodium accumulation in the potassium salt treating bath.

In general, the sodium content of the bath is held below 10 percent by weight, and preferably below 5 percent by weight, based upon the combined weight of sodium and potassium in the bath.

At the onset and during the early stage(s) of any given dipping campaign, the sodium content is generally below 2 percent by weight and rarely exceeds 1 percent by weight. Most preferably the sodium content ranges downwardly from 1 percent by weight to a value approaching and even reaching 0 percent by weight.

The sodium content of the dipping bath should not be permitted to vary more than 5, and preferably less than 2, percent by weight (based upon the total combined weight of sodium and potassium in the molten bath) from the early (low sodium content) stage of dipping to the later (higher sodium content) stage thereof even though pluralities of glass sheets are dipped over a period of 1 to 20 weeks. This control can be achieved in several ways. For example, the dipped sheet may be withdrawn rapidly and allowed to drain outside the bath so that the drippings (which can contain sodium) are not returned to the bath. Moreover, in this case the period of immersion can be held to a minimum so that most of the sodium exchange takes place after the glass is withdrawn from the bath. In addition, the bath composition can be adjusted by addition of potassium salt in amounts sufficient to replace consumed or withdrawn potassium. Also portions of the bath may be withdrawn and purified.

The invention will be further understood with reference to the accompanying drawings in which.

Figure 1:
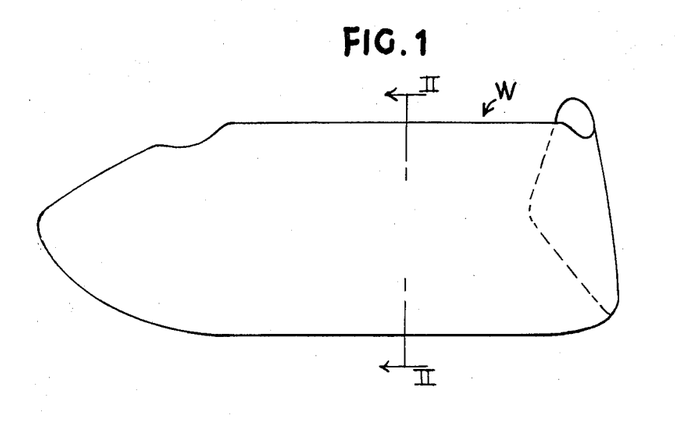
FIGURE 1 is a schematic plan view of a windshield.
Figure 2:
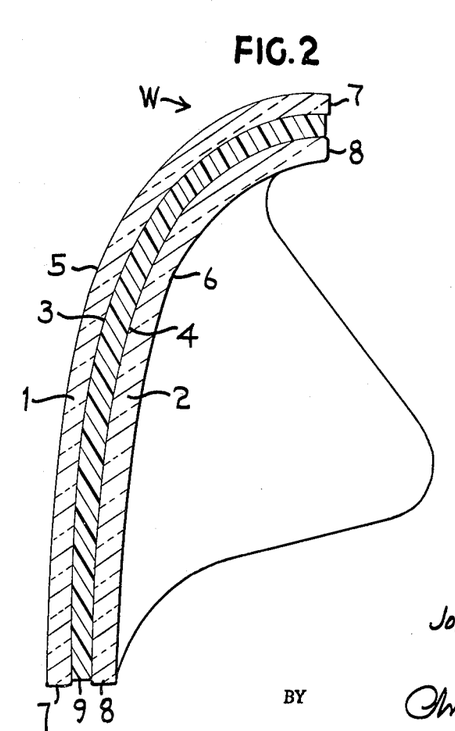
FIGURE 2 is a cross-sectional view of the windshield of FIGURE 1 taken along the line II—II.

Referring now more particularly to FIGURES 1 and 2, there is shown a curved laminated windshield W having matching curved glass lights 1 and 2 with interior facing plastic contacting surfaces 3 and 4, exterior facing surfaces 5 and 6, and outer peripheral seamed edge surfaces 7 and 8, respectively. All of the surfaces of both lights, including the outer peripheral edge surfaces, have been potassium salt treated. The interior facing surfaces 3 and 4 are tenaciously adhered together by a plastic interlayer sheet 9 which can be composed of polyvinyl butyral or any suitable thermoplastic, safety-glass interlayer material.

Figure 3:
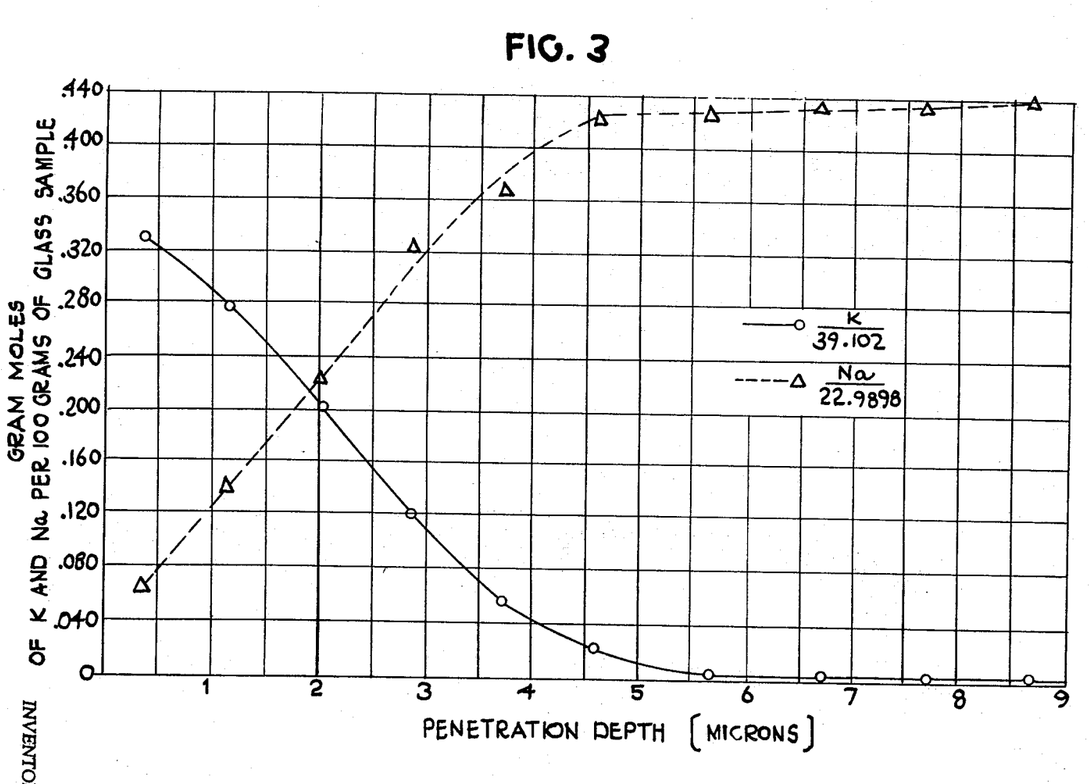
FIGURE 3 is a graph illustrating a typical variation of the potassium concentration for given penetration depths in a glass treated according to the present invention.

FIGURE 3 graphically represents the potassium concentration (triangular points) and sodium concentration (circular points) vs. penetration depth for a 4 inch by 6 inch by .090 inch glass sample treated with a molten potassium nitrate salt in accordance with this invention. The sample was a soda-lime-silica polished plate glass sample of "Composition B" as given in Example I. The sample was preheated for about 17 minutes at a temperature of about 925° F. and then immersed into a molten potassium nitrate bath maintained at 925° F. for an immersion period of 10 minutes. The sample was then cooled gradually to room temperature prior to analysis.

In conducting the analytical test, which provided the data for the curves of FIGURE 3, the potassium treated sample was repeatedly dipped in 2 percent aqueous HF etching solution for about 2-minute dip periods to remove about a one micron layer of glass for each of the ten dips. The sample was weighed before and after each of the ten dips to determine the weight of each layer removed during each dip. The thickness removed was also noted for each etching dip. After dipping for about two minutes at each dip, the sample was removed from the etching bath and rinsed with deionized water to stop the etching. The wash water was then added to the etching bath. Each etching bath sample was then dried, and subjected to spectrophotometric analysis to determine the percent by weight of potassium and sodium, respectively, present in each etched layer. Fresh 2 percent HF aqueous solutions were used for each successive dip. The data for the potassium and sodium curves of FIGURE 3 is hereinbelow reproduced.

The values for gram moles of potassium per 100 grams of glass sample were obtained by dividing the analyzed percent by weight of potassium for each given etched sample by the atomic weight of potassium. The corresponding values of sodium were calculated in the same manner except, of course, the atomic weight of sodium was used as the divisor.

While the windshield depicted in FIGURE 2 of the drawings has all of its surfaces potassium treated, it should be realized that the present invention also embraces windshields having only the following surfaces or at least selected portions thereof potassium exchange treated:

(a) both interior facing, plastic contacting surfaces 3 and 4;
(b) both exterior facing surfaces 5 and 6;
(c) any one or both of edge surfaces 7 and 8;
(d) interior facing surface 4 and exterior facing surface 5;
(e) interior facing surface 3 and exterior facing surface 6;
(f) one or both of edge surfaces 7 and 8, in conjuction with any one of treating patterns (a), (b), (d) and (e);
(g) both interior facing surfaces 3 and 4 and exterior facing surface 5;
(h) both interior facing surfaces 3 and 4 and exterior facing surface 6;
(i) both exterior facing surfaces 5 and 6 and interior facing surface 3;
(j) both exterior facing surfaces 5 and 6 and interior facing surface 4;
(k) one or both of edge surfaces 7 and 8, in conjunction with any one of treating patterns (g) to (k), inclusive;
(l) any one of surfaces 3, 4, 5 and 6;
(m) one or both of edge surfaces 7 and 8, in conjunction with treating pattern (l);
(n) all of surfaces 3, 4, 5 and 6; and
(o) any one or both of edge surfaces 7 and 8, in conjunction with treating pattern (n).

Various advantages are secured with the various treating patterns set forth hereinabove. For example, according to treating pattern (l) only exterior facing surface 5 is potassium exchange treated. This provides strength in the outermost (exposed) surface of the windshield to avoid breakage due to stones or other small objects which may be tossed from the street onto the windshield by the tires of other cars on the road.

According to treating pattern (c) only both edge surfaces 7 and 8 can be potassium treated. This provides the windshield with edge strength to resist breakage when the edges thereof are subjected to mechanical shocks and vibrations transmitted from the chassis of the vehicle through the windshield mounting gasket into the windshield. The transmitted mechanical shocks and vibration act first upon the edges of the windshield. Hence, increase in edge strength assists in preventing breakage.

| Etching bath sample | Weight of glass removed (grams) | Thickness of glass layer removed (microns) | Cumulative thickness of glass removed (microns) | Penetration depth for plotting points (microns) | Potassium content (percent by weight) | Gram moles of potassium per 100 grams of samples | Sodium content (percent by weight) | Gram moles of sodium per 100 grams of sample |
|---|---|---|---|---|---|---|---|---|
| 1 | 0.0712 | 0.742 | 0.742 | 0.371 | 12.8 | .3273 | 1.7 | .0730 |
| 2 | 0.0813 | 0.847 | 1.589 | 1.166 | 10.9 | .2787 | 3.0 | .1305 |
| 3 | 0.0817 | 0.851 | 2.440 | 2.014 | 8.0 | .2046 | 5.1 | .2218 |
| 4 | 0.0831 | 0.866 | 3.306 | 2.873 | 4.7 | .1202 | 7.4 | .3219 |
| 5 | 0.0787 | 0.820 | 4.126 | 3.726 | 2.3 | .0588 | 8.4 | .3654 |
| 6 | 0.0954 | 0.994 | 5.120 | 4.573 | 0.94 | .0240 | 9.7 | .4219 |
| 7 | 0.1000 | 1.042 | 6.162 | 5.641 | 0.19 | .0048 | 9.8 | .4263 |
| 8 | 0.1007 | 1.049 | 7.211 | 6.687 | 0.09 | .0023 | 10.0 | .4349 |
| 9 | 0.0916 | 0.955 | 8.166 | 7.688 | 0.03 | .0007 | 10.0 | .4349 |
| 10 | 0.0939 | 0.979 | 9.145 | 8.656 | 0.03 | .0007 | 10.1 | .4393 |

According to treating pattern (a) only interior facing, plastic-contacting surfaces 3 and 4 can be potassium exchange treated. This provides protection for the treated surfaces 3 and 4 from abrasion and weathering, and hence insures retention of their strength characteristics.

Of course, the greatest measure of strength benefits of the present invention are provided according to treating pattern (o) wherein all of surfaces 3, 4, 5, 6, 7 and 8 are potassium treated. This is the case because all of the surfaces of both windshield lights 1 and 2 are provided with increased strength.

The following examples serve to illustrate the invention in greater detail. However, it should be understood that the invention in its broadest aspects is not necessarily limited to the particular materials, thicknesses, and process conditions set forth below in the examples:

EXAMPLE I

Thirteen 2' by 2' flat soda-lime-silica polished glass plates of the thicknesses and glass composition specified in Table 1 below had either of the following compositions:

|  | Composition A (percent by weight) | Composition B (percent by weight) |
| --- | --- | --- |
| Component: |  |  |
| $SiO_2$ | 71.35 | 71.65 |
| $Na_2O$ | 13.24 | 13.20 |
| $K_2O$ | 0.03 | 0.03 |
| $CaO$ | 11.76 | 11.83 |
| $MgO$ | 2.41 | 2.40 |
| $Al_2O_3$ | 0.12 | 0.20 |
| $Na_2SO_4$ | 0.53 | 0.57 |
| $Fe_2O_3$ | 0.53 | 0.117 |

The glass plates of samples 1–9 were placed in horizontal stainless steel carrying racks with each sheet being carried at a slope of 15 degrees with the horizontal axis of the carrying rack. Fiber glass tape without binder was wrapped around the support posts of the stainless steel carrying racks and over the weight bearing support points to reduce possible mechanical damage to the edge of the glass sheets. The fiber glass tape also served to reduce the heat transfer rate from the edge of the glass to the support posts. Samples 1–9 were conveyed with the width dimension (distance from bottom edge to top edge) parallel to the horizontal path of the racks along the treatment line. Samples 1–9 were then preheated in a glass lehr to raise the glass temperature from ambient room temperature to a temperature of from 900° to 925° F. using radiant gas burners operated at an air-to-gas ratio of 12 to 1. The preheating operation was conducted over a period of about 17 minutes.

Then the preheated plates of samples 1–9 were immersed with their racks into a molten potassium nitrate bath maintained at a temperature of 925° F. for an immersion period of 10 minutes.

The lehr was heated from above with gas heat supplied by radiant gas burners disposed several feet above the level of the molten pool, and these burners were also operated at an air-to-gas ratio of 12 to 1, and from below by electric heating devices placed in the bottom of the lehr external to the treating tank to insure the maintenance of a uniform treating temperature in the molten potassium nitrate bath. The temperature controls employed in the tank containing the molten potassium nitrate are such that allow the temperature of 925° F. to be maintained within about a plus or minus 10° F. temperature deviation.

The tank containing the molten potassium nitrate was 6' x 3' x 13.5" to allow total immersion of the flat glass plates. The molten salt bath was maintained at a 12" depth sufficient to insure total immersion of the glass sheets of samples 1–9.

After contacting the glass plates of samples 1–9 with molten potassium nitrate for a period of approximately 10 minutes, the racks were then raised out of the molten potassium salt treating bath, and conveyed through an insulated tunnel cooling section of the lehr to allow cooling thereof in a gradual manner so that the drop in temperature during the cooling operation would not cause warpage or breakage.

After effecting a substantial degree of cooling, viz., cooling to temperature of approximately 200° F. to 250° F., the glass was then allowed to cool to the ambient room temperature outside the oven. The entire period of cooling from the time the glass was removed from the molten potassium salt pool was about 30 to 35 minutes.

The glass was then racked while at approximately room temperature with the width dimension of the racked plates in the vertical position, and the treated glass plates were cleaned to remove the excess potassium nitrate. The washed plates were then allowed to dry in a vertical position at room temperature. Water was employed for this purpose.

The four control samples, samples 10–13, were not potassium treated, but were of the same compositions as used in samples 1–9 as noted from Table 1. Load strength test samples 4" x 4" were cut from all sixteen plates and subjected to load strength testing using concentric ring loading on the four-inch square test samples. The outer ring had a diameter of 3 inches and the inner ring had a diameter of 1.5 inches. The load speed was 0.2 inch per minute, and the reported load strengths are the strengths (lbs.) at which failure (glass breakage) occurred.

The average potassium surface penetration depth (microns) of samples 1–9 was determined by optical birefringence. This method is accurate for determination of qualitative potassium diffusion within a realm of experimental error of about two microns plus or minus. These values are reported in Table 1.

TABLE 1

| Sample | Glass composition | Sheet thickness (inches) | Average load Strength (pounds) | Average K surface penetration (microns) |
| --- | --- | --- | --- | --- |
| 1 | A | 0.125 | | |
| 2 | A | 0.125 | 1,020 | 5.5 |
| 3 | A | 0.125 | | |
| 4 | B | 0.125 | | |
| 5 | B | 0.125 | 1,020 | 6.0 |
| 6 | B | 0.125 | | |
| 7 | B | 0.090 | | |
| 8 | B | 0.090 | 788 | 6.0 |
| 9 | B | 0.090 | | |
| 10 | B | 0.125 | 377 | |
| 11 | B | 0.125 | | |
| 12 | B | 0.090 | 293 | |
| 13 | B | 0.090 | | |

As will be noted from the above data, the strength of the treated glass articles of this invention is greater than that of conventional untreated polished plate glass.

EXAMPLE II

Eight 12" x 12" flat, polished, plate glass samples (samples 14–21) of "Composition B," as given in Example I, were subjected to a potassium salt treatment in a molten potassium nitrate bath under the same conditions as set forth above in conjunction with Example I.

Samples 14–21 were then subjected to impact resistance tests using a 0.5 pound, 1.5 inch diameter steel ball dropped from various heights to failure of the glass samples (glass breakage).

Eight control samples (samples 22–29) 12" by 12" flat, polished, plate glass also of "Composition B" were also tested. These samples were not potassium treated, however. All samples were clamped in a support frame prior to testing.

The impact resistance data of samples 14–29 is reproduced hereinbelow in Table 2.

TABLE 2

| Sample: | Sheet thickness (inches) | Average drop height to break (feet) | Average contact velocity at impact breakage (miles per hour) |
| --- | --- | --- | --- |
| 14 | 0.125 | | |
| 15 | 0.125 | 10.0 | 17.0 |
| 16 | 0.125 | | |
| 17 | 0.125 | | |
| 18 | 0.090 | | |
| 19 | 0.090 | 10.0 | 17.0 |
| 20 | 0.090 | | |
| 21 | 0.090 | | |
| 22 | 0.125 | | |
| 23 | 0.125 | 2.5 | 8.7 |
| 24 | 0.125 | | |
| 25 | 0.125 | | |
| 26 | 0.090 | | |
| 27 | 0.090 | 2.0 | 7.7 |
| 28 | 0.090 | | |
| 29 | 0.090 | | |

As will be noted from the above data, samples 14–21, potassium treated in accordance with this invention, were more resistant to impact than were samples 22–29 which had not been treated.

EXAMPLE III

Twenty-four soda-lime-silica glass windshield lights of the glass composition and thickness noted below in Table 3 were cut from polished, flat glass sheets into matching pairs (doublets) for bending.

After cutting, the windshield lights were edge seamed by combined diamond wheel and abrasive belt techniques. The lights were then washed. Then a separator (parting) material, viz., "Celite," which is diatomaceous earth manufactured by the Johns-Manville Corporation, was dusted on the interior facing, plastic-contacting surfaces of each matching light in preparation for bending. The matching pairs of lights were then subjected to preheating followed by bending on a bending mold at bending temperatures ranging from 1000° F. to 1100° F. for a total period, inclusive of preheating and bending, ranging from 15 to 18 minutes until bending was completed.

The windshield lights were bent to the general complex curvature shown in FIGURES 1 and 2. The bent sheets were then annealed and gradually cooled to room temperature over a period of 27 to 30 minutes. The entire preheating, bending, annealing and room temperature cooling cycle was preformed in a period ranging from 42 to 48 minutes. After cooling, the parting material was allowed to remain on the glass sheets.

The doublet pairs, samples 30–41, were then separated and placed in a horizontal stainless steel carrying device (rack) with each individual sheet being carried at a slope of 15 degrees with the horizontal axis of the carrying rack.

Doublet samples 30–35 were then preheated in the glass lehr to raise the temperature of the glass from the ambient room temperature conditions prior to contact with the potassium salt to a temperature ranging from 900° F. to 925° F. using radiant gas burners operated at an air-to-gas ratio of 12 to 1. This preheating operation was conducted over a period of about 17 minutes. Then the preheated doublet sheets of samples 30–35 were immersed with their racks into a molten potassium nitrate bath maintained at a temperature of 925° F. for an immersion period of 10 minutes under the same conditions as set forth above in Example I.

Doublet samples 36–41 were neither treated with the potassium nitrate, nor subjected to any heat treatment except that involved due to the heating occurring during bending.

The twelve pairs of bent doublets, samples 30–41, were then washed with water to remove the parting material (samples 30–41) as well as the solidified potassium nitrate salt (samples 30–35). The washed doublet samples were then racked in a vertical position and allowed to dry at room temperature.

All twelve matched, bent doublet pairs were then laminated using polyvinyl butyral interlayer sheets of the thickness noted in Table 3 below to produce safety glass windshields.

The laminating was conducted in two stages. The first stage, viz., prepressing, was performed using rubber tubing edge channels as described in Keim patent U.S. 2,948,645. The matching pairs of bent lights were assembled with the interlayer therebetween to form sandwich structures. The tubing was then fitted around the edge periphery of each sandwich and connected to a vacuum source. The prepressing was performed at a temperature of 300° F. for 13 minutes using a vacuum of 26–29 inches of mercury.

The prepressed windshield samples were then autoclaved in an oil autoclave for 45 minutes at 275° F. using 200 pounds per square inch autoclaving pressure. Following the autoclaving the laminated windshields were allowed to cool to room temperature. Table 3 below sets forth the glass sheet thickness, glass composition and interlayer thickness for each of laminated windshield samples 30–41. The glass compositions noted are those given in Example I above.

TABLE 3

| Sample: | Glass composition | Glass sheet thickness (inches) | Potassium salt treated | Interlayer thickness (inches) |
| --- | --- | --- | --- | --- |
| 30 | "Composition B" | 0.090 | Yes | 0.015 |
| 31 | do | 0.125 | Yes | 0.015 |
| 32 | do | 0.090 | Yes | 0.025 |
| 33 | do | 0.125 | Yes | 0.025 |
| 34 | "Composition A" | 0.125 | Yes | 0.015 |
| 35 | do | 0.125 | Yes | 0.025 |
| 36 | "Composition B" | 0.090 | No | 0.015 |
| 37 | do | 0.125 | No | 0.015 |
| 38 | do | 0.090 | No | 0.025 |
| 39 | do | 0.125 | No | 0.025 |
| 40 | "Composition A" | 0.125 | No | 0.015 |
| 41 | do | 0.125 | No | 0.025 |

Windshield samples 30–41, inclusive, were then mounted in a standard rubber glazing channel retained in an angle iron frame for impact-penetration testing using a lead-filled, wooden ball which was 8 inches in diameter and weighed 30 pounds. The sample is considered to have passed the test if the ball is retained by the sample 50 percent of the time for any given drop height.

When subjected to the above test, windshield samples 30–35 possessed superior impact-penetration resistance as compared to the untreated, conventional control windshields (samples 36–41).

EXAMPLE IV

Thirty-six 4 inch by 4 inch by 0.125 inch polished soda-lime-silica glass plates of identical glass composition (samples 42–77) were preheated for ten minutes to the respective temperature at which the potassium salt bath was maintained and then immersed in a molten potassium nitrate bath for immersion periods noted below. Then the plates were removed from the potassium salt bath and heated while still in contact with the immersion-provided potassium nitrate films for the heating periods noted.

Samples 42–47, inclusive, (Group I) were preheated for 10 minutes at 950° F. and then immersed in the molten potassium nitrate bath for a period of 15 seconds. The potassium nitrate salt treating bath was maintained at a temperature of 950° F. Then samples 41–46 were heated at 950° F. while out of the treating tank for a period of approximately 15 minutes.

Samples 48–53 (Group II) were preheated for 10 minutes at 950° F., and dipped for 30 seconds at 950° F. This was followed by out of tank heating at 950° F. for 15 minutes.

Samples 54–59 (Group III) were preheated for 10 minutes at 950° F., and dipped for 60 seconds at 950° F. This was followed by out of tank heating at 950° F. for 15 minutes.

13

Samples 60–65 (Group IV) were preheated for 10 minutes at 1050° F., and dipped for 15 seconds at 1050° F. This was followed by out of tank heating at 950° F. for 15 minutes.

Samples 66–71 (Group V) were preheated for 10 minutes at 1050° F., and dipped for 30 seconds at 1050° F. This was followed by out of tank heating at 950° F. for 15 minutes.

Samples 72–77 (Group VI) were preheated for 10 minutes at 1050° F., and dipped for 60 seconds at 1050° F. This was followed by out of tank heating at 950° F. for 15 minutes.

Control samples (samples 78–113) of the same size, thickness, and glass composition as samples 42–77, were subjected to the same temperature conditions as samples 41–76, respectively, but were not contacted with the potassium nitrate treating bath.

Samples 42–113 were then strength tested for load strength using the concentric ring test described in Example I above. Samples 42–77, respectively, possessed superior load strengths as compared to the conventional polished soda-lime-silica glass plates (samples 78–113, respectively) which were not subjected to potassium treatment in accordance with this invention.

From this example, it is evident that the potassium treatment can be conducted using short periods of immersion at high temperatures while still securing superior strength characteristics as compared to untreated plates.

EXAMPLE V

Flat polished plate glass samples 12 inches by 12 inches by 0.125 and 0.090 inch, respectively, were potassium treated in accordance with the procedure set forth in Example I. These glass plates were all of "Composition B" as given in Example I.

The treated samples were then washed and laminated using 12 inch by 12 inch polyvinyl butyral interlayer sheets 0.015 inch and 0.025 inch thick, respectively. The laminating procedure consisted of prepressing and autoclaving under the same conditions set forth above in Example III with the exception that no rubber edge channel was used.

Corresponding flat control sample plates were also laminated, but were not subjected to the potassium nitrate salt treatment.

Then all forty-eight laminate samples were tested for impact strength (drop height to breakage) with steel balls 0.5 inch, 0.687 inch and 1.5 inches and weighing 7.6 grams, 21.7 grams and 220 grams, respectively. The above described impact tests were conducted at temperatures of 75° F. (clamped frame).

14

Also, all samples were subjected to impact strength tests which were performed using a 0.5 pound steel ball to determine drop height to breakage. The 0.5 pound impact tests were conducted on all samples at temperatures of 0° F., room temperature (68°–78° F.), and 120° F., respectively.

The glass sheet thickness, interlayer thickness, and testing conditions are summarized below in Table 4 for the treated samples (samples 114–137).

The untreated corresponding control samples (samples 138–161) were of the same glass and interlayer thickness, respectively, and were subjected to the same tests, respectively, as noted in Table 4 for the treated samples. Of course, samples 138–161 were not treated with potassium nitrate.

The impact strength of the potassium nitrate salt treated flat laminates, samples 114–137, was superior to that of the untreated control samples, samples 138–161, under all test conditions.

TABLE 4

| Sample | Glass sheet thickness (inches) | Potassium salt treated | Interlayer thickness (inches) | 75° F. 0.5 inch, 7.6 gram ball | 75° F. 0.687 inch, 21.7 gram ball | 75° F. 1.5 inch, 220 gram ball | 0.5 Pound ball 0° F. | 0.5 Pound ball Room temp. | 0.5 Pound ball 120° F. |
|---|---|---|---|---|---|---|---|---|---|
| 114 | 0.090 | Yes | 0.015 | X | | | | | |
| 115 | 0.125 | Yes | 0.015 | X | | | | | |
| 116 | 0.090 | Yes | 0.025 | X | | | | | |
| 117 | 0.125 | Yes | 0.025 | X | | | | | |
| 118 | 0.090 | Yes | 0.015 | | X | | | | |
| 119 | 0.125 | Yes | 0.015 | | X | | | | |
| 120 | 0.090 | Yes | 0.025 | | X | | | | |
| 121 | 0.125 | Yes | 0.025 | | X | | | | |
| 122 | 0.090 | Yes | 0.015 | | | X | | | |
| 123 | 0.125 | Yes | 0.015 | | | X | | | |
| 124 | 0.090 | Yes | 0.025 | | | X | | | |
| 125 | 0.125 | Yes | 0.025 | | | X | | | |
| 126 | 0.090 | Yes | 0.015 | | | | X | | |
| 127 | 0.125 | Yes | 0.015 | | | | X | | |
| 128 | 0.090 | Yes | 0.025 | | | | X | | |
| 129 | 0.125 | Yes | 0.025 | | | | X | | |
| 130 | 0.090 | Yes | 0.015 | | | | | X | |
| 131 | 0.125 | Yes | 0.015 | | | | | X | |
| 132 | 0.090 | Yes | 0.025 | | | | | X | |
| 133 | 0.125 | Yes | 0.025 | | | | | X | |
| 134 | 0.090 | Yes | 0.015 | | | | | | X |
| 135 | 0.125 | Yes | 0.015 | | | | | | X |
| 136 | 0.090 | Yes | 0.025 | | | | | | X |
| 137 | 0.125 | Yes | 0.025 | | | | | | X |

EXAMPLE VI

Flat polished plate glass samples of "Composition B" as set forth in Example I and having dimensions of 12 inch by 12 inch by 0.090 and 0.125 inch, respectively, were potassium treated, washed, and laminated with 12 inch by 12 inch polyvinyl butyral interlayer sheets 0.015 and 0.025 inch thick, respectively, as in Example V.

Corresponding flat control sample sheets were also laminated, but were not subjected to the potassium nitrate salt treatment.

Then all samples were subjected to an extensive series of high velocity impact tests conducted to compare the damage done to the 12 inch square control laminates and the 12 inch square potassium nitrate treated laminates when hit with brass-coated steel BB's each weighing 0.351 gram and of a 0.170 inch diameter.

The BB's were fired at the laminates from a "Daisy" air rifle at a distance of 15 feet from the laminates at a velocity of 187 miles per hour (275 feet per second). Five shots were made at spaced locations on each of the laminates at a 90 degree angle for glass temperatures of 15° F., 75° F., 120° F. and 140° F. The same comparisons were repeated at angles of 45 degrees and 15 degrees for glass temperatures of 15° F., 75° F. and 120° F.

Additional tests were made using a "Whamo" sling shot device at a 20 inch pull back at 75° F. to hurl (a) 0.250 inch steel balls weighing 1.1 grams and (b) 1 inch by 0.5 inch road stones with an average weight of 11.0 grams. Projectiles (a) and (b) were shot from the "Whamo" sling slot at a velocity of 55 miles per hour (80 feet per second) and a distance of 15 feet from the laminates. The angle of contact was 90 degrees.

The laminated samples tested were of the four types noted in Table 5 below, with the only difference being the presence or absence of the potassium salt treatment.

TABLE 5

| | Glass sheet thickness (inches) | Interlayer thickness (inches) |
|---|---|---|
| Laminate type: | | |
| 1 | 0.090 | 0.015 |
| 2 | 0.090 | 0.025 |
| 3 | 0.125 | 0.015 |
| 4 | 0.125 | 0.025 |

The high velocity impact resistance of the potassium nitrate treated laminates of Types 1-4, inclusive, was superior to that of the untreated control samples of Types 1-4, inclusive, under all test conditions for both the BB and "Whamo" sling shot tests.

EXAMPLE VII

Four soda-lime-silica flat polished plate glass sheets of "Composition B" in Example I and having dimensions of 32 inches by 4 inches by 0.125 inch were potassium salt treated as in Example I.

Four additional sheets of identical glass composition and having dimensions of 32 inches by 4 inches by 0.250 inch were not potassium salt treated and served as control samples. Instead of the potassium salt treatment, the control samples were thermally tempered. The thermal tempering was performed by rapidly raising the glass to a temperature of from 1150° F. to 1250° F. (mean peak temperature of 1200° F.) in a period of from 3.5 to 5.5 minutes followed by rapid cooling, i.e., quenching for from 20 to 30 seconds with compressed air. The air prior to compression was at room temperature whereas after compression the air temperature at the time of quenching range from 90° F. to 100° F. After quenching, these control samples were then allowed to further cool to room temperature. The thermal tempering cycle averaged approximately six minutes for the four samples.

All eight samples were then subjected to cutting tests using a punch-type cutting device to determine if the samples could be cut without shattering.

The glass sheets which were potassium salt treated did not shatter upon cutting, but the thermally tempered sheets shattered immediately upon cutting.

The 4 inch by 4 inch load strength samples were cut from each potassium salt treated sheet, and these samples were subjected to concentric ring load testing as in Example I. The load strengths of these samples compared closely to the reported average load strength for samples 4-6 of Example I.

Thus, the glass sheets treated in accordance with this invention can be cut after treatment without loss of strength.

It was impossible to load strength test the thermally tempered samples after cutting due to their shattering.

The potassium treated glass articles of this invention are characterized by the following features:

(A) High breaking stress and impact resistance;

(B) High tensile strength;

(C) The treated portions of the major surfaces, edges, and sides of the glass article are in compression for a thickness of at least 1 micron (usually below 5 microns) with a maximum compressive stress at the surface layers of at least 20,000 p.s.i.;

(D) A central interior thickness of the glass article of about 80 percent to 90 percent of the total thickness of the glass article, said central interior thickness being in tension with a maximum central tensile stress not substantially exceeding 200 pounds per square inch;

(E) A ratio of maximum surface compression to maximum center tension of at least about 100 to 1;

(F) The outer surface weight ratio concentration of potassium to sodium is in excess of 5 to 1. Moreover, this ratio is at least 100 to 250 or more times the ratio of potassium to sodium in the center of the glass article. This outer surface ratio persists for a depth of about 2 microns or more, but rarely exceeds 10 microns;

(G) The ability to be cut without violent breakage or shattering and without substantial loss in strength properties;

(H) The edges of the glass have the smoothness characteristic of a seamed or polished edge. This is due to the fact that the glass subjected to treatment has been previously subjected to edge seaming to smooth the corners and the upper and lower edges of the glass. Consequently, the compressive stress imparted by the chemical treatment herein contemplated is transmitted around the corners and also more or less continuously from the upper and lower surfaces around the edges to the sides of the sheet; and (I) The treated glass shows little or no strain pattern when viewed in a direction perpendicular to the major surfaces of the glass under polarized light.

The center tension (tensile stress) measurements for the potassium salt treated articles of this invention is determined by an optical method. The method employed is one usually used for rating the degree of anneal in annealed glass samples.

The method consists of a measure of the center tension stress obtained by viewing along the center plane of the glass plate being measured. A graduated quartz switch is used to measure this stress optically, expressed in millimicrons of birefringence (often abbreviated as mu) per inch or per centimeter of viewing section. The quartz switch can be used as an accessory on a polarizing microscope for viewing small samples or it can be adapted with separate lens, light source and polarizer for viewing through larger samples. It is not practical to view through more than 20 times the thickness of flat glass. With the use of prisms, it is possible to view across the corners of large flat plates. When measuring center tensile stress in curved plates, it is desirable to measure in a direction where the bow is at a minimum or reduce the viewing section until the bow is less than 10 percent of the glass thickness.

The optical rating of stress expressed as mu per square inch can be converted readily to mechanical pounds per square inch stress units by multiplying by the stress-optical coefficient which is 2.13 for most conventional plate and sheet glass.

The surface compression (compressive stress) measurements are also determined optically, but by a different method.

Surface compression stress is measured with an instrument known as a differential surface refractometer since it measures a quantity proportional to the differential between refractive indices for light polarized parallel and perpendicular to the glass surface. The instrument consists essentially of an incandescent light bulb, a rectangular prism with a refractive index higher than that of the surface of the glass, and the viewing telescope. The lower face of the prism is placed in contact with the glass surface with a liquid of intermediate refractive index between. In the telescope, bright lines are seen and the distance between them is proportional to the surface stress. This distance is measured with a micrometer eyepiece previously calibrated in terms of pounds per square inch per scale division. By observing line separation on glass surfaces subjected to known mechanical stress or conventional thermally tempered surfaces usually only two lines are visible, one polarized perpendicular to and the other parallel to the plane of incidence of the light rays on the glass surface. The potassium salt treated glass surfaces usually exhibit multiple sets of lines, each representing the stress at a particular depth in the stress layer. These lines are usually seen as dispersed spectra due to chromatic variation of the critical angle between the prism and the glass surface. By means of an adjusting screw, the angle between the prism and the glass surfaces is adjusted to achromatize the sets of lines representing the stress condition at the surface of the ion exchange layer.

One of the prime facets of this articles of the present invention resides in glass closures, which can be transparent (primarily viewing closures), translucent, and/or opaque. These glass closures can be in the form of monolithic sheets, e.g., architectural spandrels, or laminates, e.g., safety-glass windshields for automobiles, airplanes, boats, and other transportation compartments. Architectural laminates for buildings and rooms can also be produced readily and are within the purview of this invention.

The present invention also encompasses articles having only a selected portion(s) of a respective surface(s) potassium treated, as well as potassium treatment of the entire surface of all surfaces of the article, respectively.

Moreover, this invention includes composite articles containing various combinations of types of potassium treated articles, such as composite insulation spandrels and like glass closures, whether comprising individual monolithic potassium treated sheets or laminates formed therefrom whether flat or curved. For example, this invention includes insulation spandrels (two or more potassium treated spandrels mounted in a common frame with air space(s) therebetween) having a decoratively printed or colored plastic sheets(s) located in the air space(s). In such a structure any one of the glass spandrel panels can be transparent, transulcent or oqaque, and colored or not colored. For example, the outer potasium treated spandrel can be transparent and the inner (facing towards the inside of the building) potassium treated spandrel can be opaque with the intermediately located decorative plastic sheet located in the air space therebetween. Thus, the decorative sheet can be seen when viewing from the outside-in but not seen when viewing from the inside-out. Or a reverse arrangement can be adopted. These and other arrangements can be secured with laminates also.

Moreover, the articles of the present invention can also be subjected to conventional processing techniques such as thermal tempering (preferably prior to potassium salt treatment); cutting operations; laminating operations; etc., to produce glass articles having enhanced surface strength, impact resistance, and penetration resistance.

While the production of the glass articles of this invention has been described hereinabove with regard to the use of high temperatures for fairly short potassium treatment periods, i.e., less than one hour; it should be realized that potassium treatment can be conducted at significantly lower temperatures over extended time periods. Although commercial production favors the short time-high temperature procedure as a matter of economics and convenience; the articles of the present invention can be produced at lower temperatures as long as the temperature is sufficiently high to allow some potassium exchange to the take place, whether using molten or finely divided solid potassium salts to effect treatment. For example, where time is not a controlling factor the potassium treatment can be performed at temperatures ranging from about 400°–800° F. over time periods ranging from about several weeks or days to several hours, with the longer time periods coinciding with the lower temperatures and vice versa.

As noted above, the prevent invention is by no means limited to producing glass sheets to be employed in windshields, but also extends to a wide spectrum of usage, including, but not limited to, production of glass articles to be used for: building materials; architectural applications; bottles, e.g., containers for liquids; drinking glasses; viewing closures such as window panes; safety-glass and other laminated structures; glass insulation structures wherein a plurality of glass sheets are arranged in a spaced fashion with a layer of air serving as the insulation medium; television safety-glass implosion and/or explosion shields; glass roofs or transparent domes in vehicles and buildings; experimental devices such as glass engine parts which must withstand a high compression; ceramic and siliceous articles used in the dental arts such as dentures and crown caps; ceramic mufflers for automobiles, airplanes, and other vehicles; etc.

The unusual strength properties which can be achieved by the present invention can even be enhanced when glass which has been previously thermally tempered is treated with a potassium salt.

I claim:

1. A method of strengthening alkali metal containing flat glass articles comprising supporting flat glass articles having in contact therewith a salt of an alkali metal of larger atomic diameter than an alkli metal ion of said glass on a gaseous support at an elevated temperture below the strain point of the glass for a sufficient period of time to affect exchange or larger alkali metal ions of said salt for smaller alkali metal ions of said glass.

2. The method of clim 1 wherein the glass is a soda-lime-silica glass and the salt is a potassium salt.

3. The method of claim 2 wherein the salt is potassium nitrate.

4. A method of strengthening alkali metal flat glass comprising depositing on and in contact with said glass an alkali metal salt of larger atomic diameter than an alkali ion of said glass, heating said glass to an elevated temperature below the strain point of said glass while supporting said glass by gaseous means for a sufficient period of time to affect exchange of larger alkali metal ions of said salt for smaller alkali metal ions of said glass.

References Cited

UNITED STATES PATENTS 3,223,549  12/1965  Fredley et al. ______ 65—60 XR

OTHER REFERENCES

Kistler, S.S.: "Stresses in Glass Produced by Non Uniform Exchange of Monovalent Iions," Journ. of Amer. Cer. Soc., February 1962, vol. 45, No. 2, pp. 59–68.

S. LEON BASHORE, Primary Examiner

J. H. HARMON, Assistant Examiner

U.S. Cl. X.R.

65—99; 117—124

PO-1050
(5/69)

UNITED STATES PATENT OFFICE
CERTIFICATE OF CORRECTION

Patent No. 3,506,423                    Dated April 14, 1970

Inventor(x) J. W. Morris

It is certified that error appears in the above-identified patent and that said Letters Patent are hereby corrected as shown below:

Column 18, line 32, after the word "exchange", should read -- of --, not "or".

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents